United States Patent

[11] 3,631,244

| [72] | Inventor | Lowell C. Bergstedt<br>Schaumberg, Ill. |
|---|---|---|
| [21] | Appl. No. | 806,839 |
| [22] | Filed | Mar. 13, 1969 |
| [45] | Patented | Dec. 28, 1971 |
| [73] | Assignee | Nuclear-Chicago Corporation<br>Des Plaines, Ill. |

[54] TOMOGRAPHIC RADIATION CAMERA WITH MECHANICAL READOUT
8 Claims, 7 Drawing Figs.

[52] U.S. Cl............................................. 250/71.5 S,
250/105
[51] Int. Cl............................................ G01t 1/20
[50] Field of Search.............................. 250/71.5 S,
105, 108

[56] References Cited
UNITED STATES PATENTS

| 3,028,493 | 4/1962 | Takahashi..................... | 250/105 X |
| 3,291,988 | 12/1966 | Chope et al................... | 250/108 X |
| 3,432,660 | 3/1969 | Anger............................ | 250/71.5 S |

*Primary Examiner*—Archie R. Borchelt
*Attorneys*—Lowell C. Bergstedt, Walter C. Ramm and Helmuth A. Wegner ABSTRACT: An Anger-type radiation detector fitted with synchronously rotating slanted hole collimators adjacent the crystal and output phosphor screen to enable tomographic imaging of a three-dimensional distribution of radionuclides in an object. Alternatively a precessing film plane viewing the output screen may be synchronized with the rotating collimator adjacent the crystal to provide a selected in-focus image of a plane through the object.

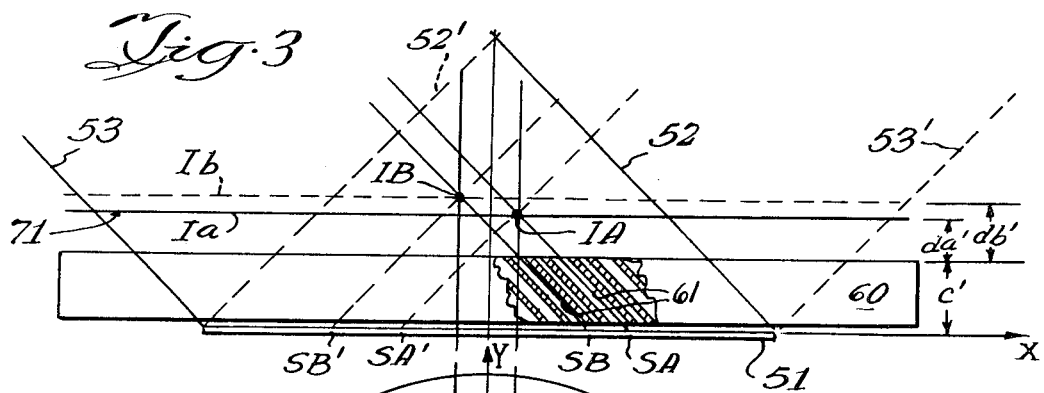
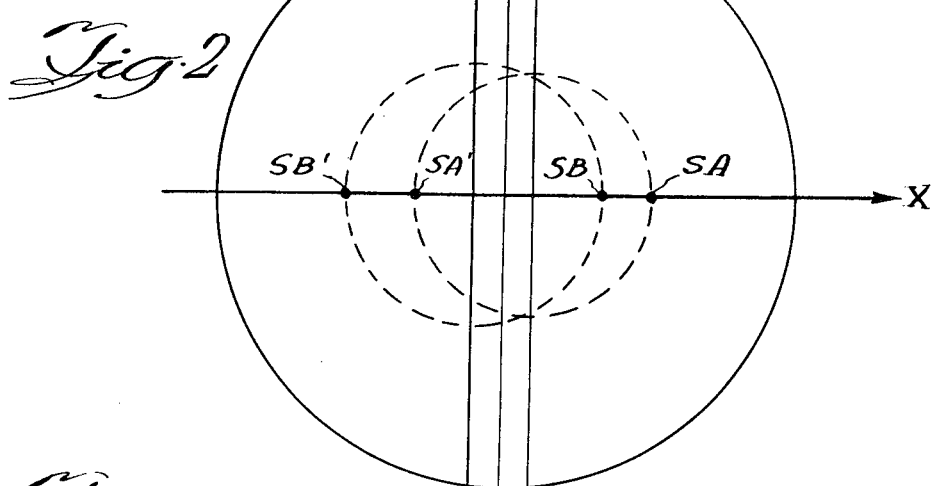
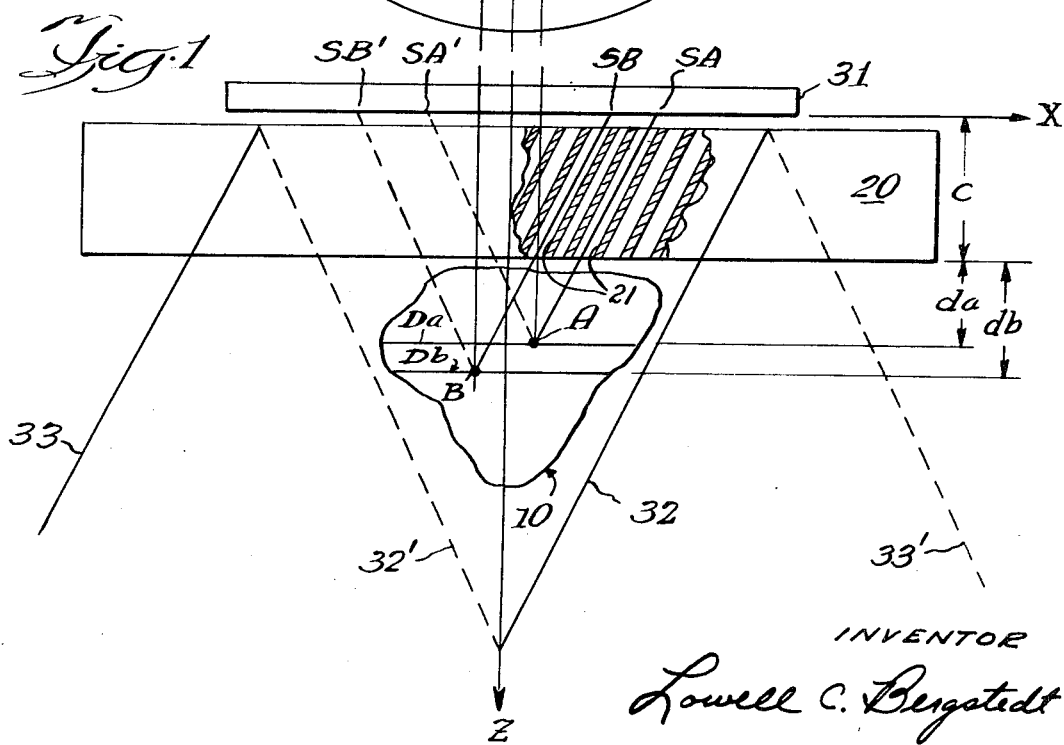
INVENTOR
Lowell C. Bergstedt

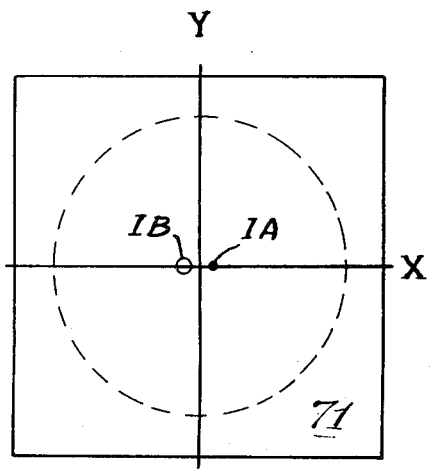
Fig. 5
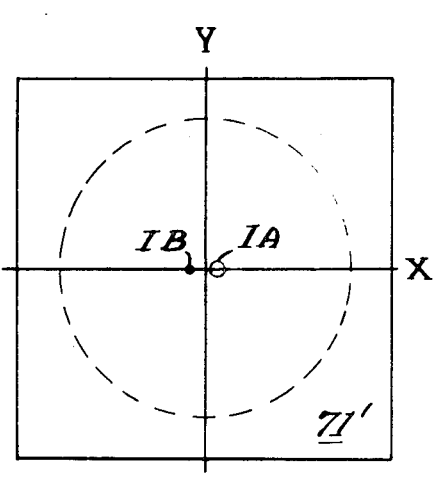
Fig. 6
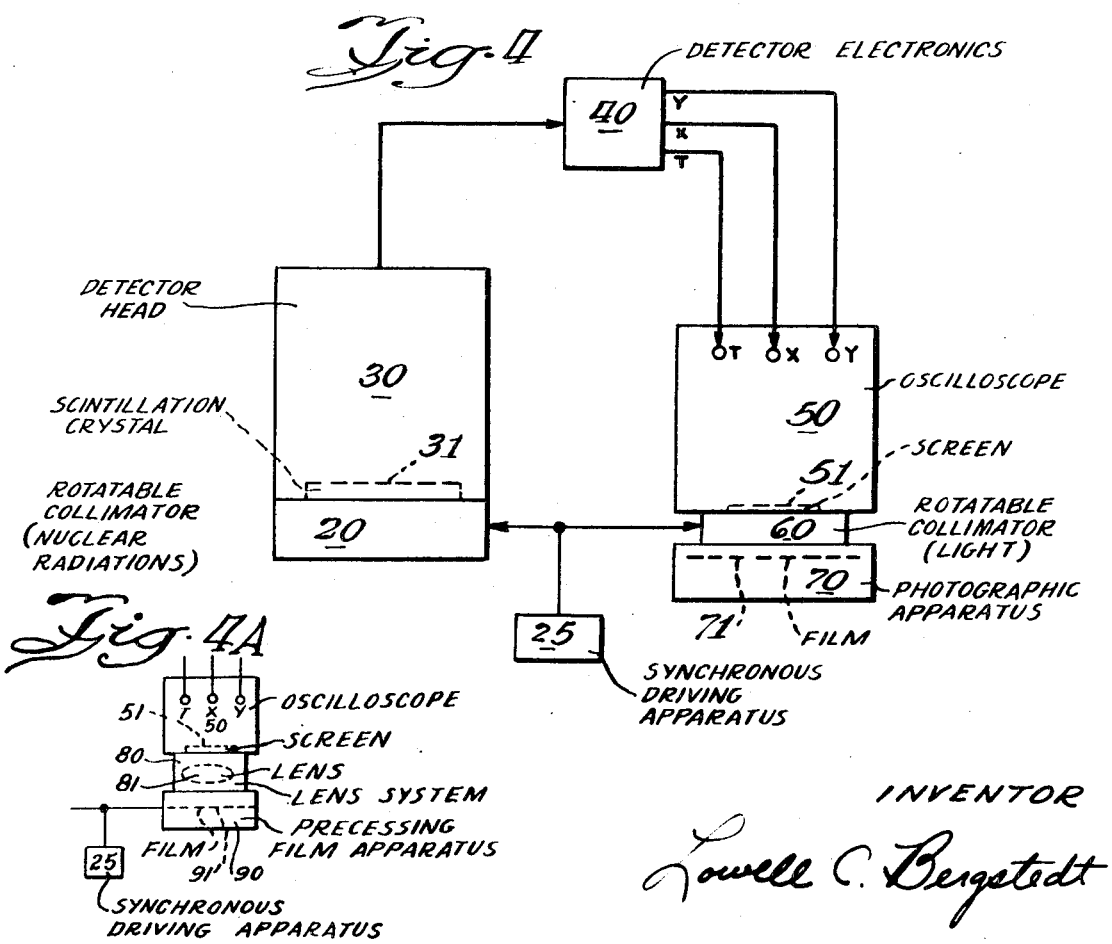
Fig. 4
Fig. 4A
INVENTOR
Lowell C. Bergstedt

TOMOGRAPHIC RADIATION CAMERA WITH MECHANICAL READOUT

In a copending patent application of William G. Walker entitled "Tomographic Radiation Camera," Ser. No. 774,320, filed Nov. 8, 1968, a camera device for producing a selected tomographic image of the distribution of radionuclides throughout an object under investigation is disclosed. The device comprises essentially an Anger-type detector head (U.S. Pat. No. 3,011,057) with a rotating slanted-hole collimator between the transducer or scintillating crystal in the detector head and the object. The rotating collimator produces circular patterns of scintillations in the crystal caused by gamma rays emanating from a point source location in the object under investigation. The x-, y-coordinate output of the detector head is transformed in accordance with particular sine and cosine signals derived from the position of the rotating collimator to produce signal inputs to an oscilloscope for displaying an in-focus image of the distribution of radionuclides across a selected plane through the object. The plane that is displayed in-focus is selected by providing a particular attenuation factor for the sine and cosine signals, and simultaneous display of more than one plane can be achieved by duplicating some of the electronics and display apparatus so that separate attenuation factors for the sine and cosine signals are produced and displayed. The Walker tomographic radiation camera requires both a mechanical and an electronic addition to the basic Anger scintillation camera to accomplish tomography.

It is the object of this invention to provide a stationary radiation-imaging device having tomographic capabilities provided by principally mechanical adaptations of a basic Anger scintillation camera system.

Apparatus in accordance with the preferred embodiment of this invention comprises essentially the radiation-detecting and displaying portions of the Anger scintillation camera with essentially similar mechanically functioning collimators associated with the detecting and display portions respectively. A rotating gamma ray collimator is mounted beneath the scintillation crystal in the detector head and a corresponding rotating light collimator is mounted in front of the faceplate of the cathode-ray tube. The rotation of the two collimators is synchronized so that the apparent motion of radioactive sources on the scintillation crystal and, correspondingly, on the cathode-ray tube display are brought back to point source images on a film plane associated with the rotating collimator on the cathode-ray tube. By varying the distance of the film plane from the cathode-ray tube, various plane distributions of radionuclides in an object viewed by the detector head will be displayed in-focus on the film plane.

An alternative embodiment of this invention involves the direct focusing of the cathode-ray tube display produced by the Anger-type detector and rotating collimator combination onto a film plane which is caused to precess in a circle of a selected radius in a synchronous manner with the rotation of the collimator. Precession of the film means that its circular movement is performed without rotation so that all points of the film describe a circle of the same radius. The radius of precession of the film will correspond with the radius of circular movement of spots on the CRT screen produced by radionuclides on a plane at a particular distance below the crystal in the detector. Differing planes can be read out photographically by altering the radius of precession of the film.

Thus, in a tomographic camera in accordance with this invention, the capability of tomographic imaging could be added to Anger-type scintillation camera systems presently in use without modifying the electronic display circuitry as is required in the Walker tomographic camera. Moreover, this invention could be implemented in two-dimensional radiation-imaging systems, such as image intensifier systems, in which no electrical coordinate signals are produced. Other objects, features and advantages of this invention will be apparent from a consideration of the following detailed description in conjunction with the accompanying drawings in which:

FIG. 1 is a schematic view of a portion of the preferred embodiment of this invention;

FIG. 2 is a schematic diagram useful in explaining the operation of this invention;

FIG. 3 is a schematic diagram of a portion of the imaging aspect of a preferred embodiment of this invention;

FIG. 4 is a block schematic diagram of a preferred embodiment of this invention;

FIG. 4A is a partial block diagram of an alternate embodiment of this invention; and FIGS. 5 and 6 are pictorial representations of various tomographic output images corresponding to the diagrams shown in FIGS. 1 through 3.

Referring now to FIGS. 1 and 2, it will be apparent that the collimator-transducer combination shown is identical to the one shown in the above-referenced Walker copending application. Collimator 20 is a rotating slanted hole collimator which has, in a reference orientation, a skewed cylindrical field of view within the lines 32 and 33, and after it has rotated through 180°, it has the same type of field of view within the lines 32' and 33'. The three-dimensional radionuclide distribution in object 10 is thus constantly within the field of view. Transducer 31, which is, in the Anger-type system, a thin, cylindrical sodium iodide crystal, receives gamma rays from radionuclides in the body 10 through the channels 21 in collimator 20. When collimator 20 is in the reference orientation, a point source of gamma rays at location A in body 10 will produce scintillations in crystal 31 at point SA. Correspondingly, a point source of gamma rays at location B, which is on a plane deeper than that of location A, produces scintillations on point SB in crystal 31. As collimator 20 rotates through 360° or one revolution, point sources A and B produce circular loci of scintillations as shown in FIG. 2.

The circular loci of scintillations produced by the rotation of collimator 20 are reproduced as circular loci of light spots on a phosphor screen 51 of a cathode-ray tube as in the Anger imaging system. In FIG. 3 a rotating light collimator 60 is shown adjacent the phosphor screen 51. Collimator 60 channels light from the phosphor screen in an angular direction nonnormal to the surface of the screen so that, when collimator 60 is in a particular orientation, any spot of light on the screen will be channelled at a particular angle toward a film plane 71. Collimator 60 could comprise a bundle of optical fibers all slanted in the same direction so that, as the collimator rotates, light from a particular spot on the phosphor screen will be directed at various times to various places on film plane 71. Collimator 60 could also comprise a cylinder of light-opaque material with a large number of slanted collimator channels 61 provided therein.

From FIGS. 1, 2 and 3 it is apparent that a gamma ray originating at source A in the body 10 in FIG. 1 comes from a particular X-, Y-coordinate and produces a scintillation SA in crystal 31 at a different X-, Y-coordinate. The scintillation SA is reproduced by the image detector system as a light spot on the phosphor screen 51 having corresponding X-, Y-coordinates. Collimator 60 directs light from the light spot SA on phosphor screen 51 toward film plane 71 at an angle such that the light strikes the film plane at the X-, Y-coordinate corresponding to the source A in object 10. As collimator 20 and collimator 60 rotate in synchronism with each other, the circular locus of scintillations produced by source A in crystal 31 will be mapped into a corresponding circular locus of light flashes on phosphor screen 51 which will, in turn, be mapped by collimator 60 and film plane 71 back into a point with the same X-, Y-coordinate as that of source A. It will be apparent that the angle of the collimating channels in collimator 60 need not be the same as the angle of the collimating channels in collimator 20, but the angle of the channels in collimator 60 together with the distance of the film plane 71 from phosphor screen 51 determines, in accordance with the angle of collimating channels in collimator 20, the particular plane in body 10 to be displayed in-focus on film plane 71. It can be seen that, in order to display in-focus the source B in body 10, film plane 71 would need be moved further away from phosphor screen 51 to occupy the position shown in dotted lines and referred to as image plane 1b.

From FIGS. 5 and 6 it is apparent that, when source A is displayed ingfocus on film plane 71, the image from source B is a circle having its center at the X-, Y-coordinate of source B and having a radius proportional to the difference in depth between the plane of source A and the plane of source B. Similarly with film 71 located at image plane 1b, gamma ray source B will be imaged as a point on film plane 71' as a point at the X-, Y- coordinate of B while the image of source A becomes a circle with its center at the X-, Y-coordinate of source A and a radius proportional to the distance between the plane of source A and the plane of source B.

It should be apparent from the above discussion that the combination of collimator 60 and film plane 71 maps a circle of light spots on phosphor screen 51 into either a point or a smaller circle. Moreover, it is apparent that by moving film plane 71 closer to or further away from phosphor screen 51 in-focus pictures will be developed of the distribution of radioactivity across related planes at various depths in object 10 beneath collimator 20. The angles of the collimating channels in collimator 60 must, of course, be chosen in accordance with the thickness C' of collimator 60 so that a film plane 71 immediately adjacent the surface of collimator 60 opposite the phosphor screen 51 will correspond to a source plane beneath the bottom surface of collimator 20. Various mathematical relationships could be developed for the relationships between the angles of collimating channels in collimators 20 and 60 and the depth of source planes and image planes respectively associated with collimators 20 and 60. It is believed, however, that the development of these expressions is unnecessary since the pictorial representation given in FIGS. 1 through 3 and 5 and 6 amply demonstrate the principle of operation of this invention.

In FIG. 4 a block schematic diagram of a preferred embodiment of the overall system of this invention is shown. The basic Anger scintillation camera detecting and display system includes a detector head 30 including a scintillation crystal 31 shown in dotted lines together with the other components of an Anger-type detector head (not shown), detector electronics 40 associated with detector head 30 to produce position coordinate signals X and Y together with a triggering signal T. The signals X, Y and T are coupled to an oscilloscope 50 which functions to produce a light spot on phosphor screen 51 corresponding to the X, Y input signals when the scope is unblanked by a trigger impulse on lead T. The details of the operation of the basic Anger-type imaging system are well known and need not be described in detail here.

Rotating slanted-hole collimator 20 for nuclear radiations and a corresponding light collimator 60 are mounted, respectively, adjacent crystal 31 in detector head 30 and phosphor screen 51 in oscilloscope 50. Collimators 20 and 60 are driven synchronously by a driving means designated as 25. Photographic apparatus 70, including a variable spaced film plane 71 are mounted adjacent collimator 60 opposite the phosphor screen 51. From the previous description of this invention in connection with FIGS. 1 through 3 and 5 and 6, it should be apparent how the equipment shown in FIG. 4 functions to develop a tomographic readout of various selected planes of radioactivity viewed through rotating collimator 20 by scintillation crystal 31. It should also be apparent from the above description of this preferred embodiment of the invention that the principles of the invention could readily be applied to any other type of two-dimensional imaging system involving a stationary two-dimensional radioactivity-imaging device. For example, the image intensifier system wherein a visual image of radioactivity distribution is developed in a more direct fashion could be adapted to produce tomographic images in accordance with the principles of this invention by providing a rotating collimator at the radiation input end of the intensifier system and a corresponding rotating collimator at the output end of the system.

An alternate embodiment of this invention involving a precessing film plane may also be described with reference to FIGS. 1 through 6 including FIG. 4A. The system is essentially the same except that light collimator 60 is replaced by a lens system 80 including at least one lens 81 for focusing a spot of light appearing on screen 51 to a film plane 91 in a precessing film apparatus 90. Precessing film apparatus 90 causes film 91 to precess in a circle in accordance with the synchonous driving apparatus 25. If film plane 91 were stationary, the image of sources A and B would be circles of particular radii depending upon minification factors, etc. If film plane 91 precesses with a radius corresponding to the radius of the otherwise circular image of source A, that source will produce a stationary spot on the film and thus be in focus. This is the same recorded image as shown in FIG. 5. Source B would be imaged as the circle shown in FIG. 5. Changing the radius of precession of film 91 to correspond to the circular image loci produced by source B would produce the picture shown in FIG. 6. It should be apparent that, as another alternative, oscilloscope 50 could be driven in a circular precession with film 91 stationary.

The above given descriptions of embodiments of this invention are given by way of example only, and it should be understood that numerous modifications could be made without departing from the scope of this invention as claimed in the following claims.

I claim:

1. Apparatus for imaging the volume distribution of radionuclides throughout an object under investigation comprising:

a radiation detector, including a radiation-sensitive transducer, of the type producing an output representing plane position coordinates of each quantum of radiation interacting with said transducer, said detector being adapted to be held stationary with respect to said object, said output being a visible elemental indicia positioned in a plane coordinate system;

first means interposed between said radiation-sensitive transducer and said object operative to produce predetermined patterned movement of each image generated on said transducer by quanta of radiation emanating from radionuclides in each elemental volume of said object, said predetermined patterned movement differing in accordance with the volume position coordinates of each said elemental volume; and second means operatively associated with said first means for translating said visible indicia in accordance with said predetermined patterned movement into a useful image presentation of the distribution of radionuclides across a plane through said object at a preselected distance from said transducer.

2. Apparatus as claimed in claim 1, wherein said transducer has a substantially planar detecting area, and said detector includes display means for producing said indicia in the form of spots of light on a substantially planar display area; said first means includes radiation-shielding means defining a substantially uniform radiation acceptance direction for each elemental area of said transducer, and first driving means operatively associated with said radiation-shielding means for repetitively changing said radiation acceptance direction; and said second means includes a light-recording medium spaced from said display area, light transmission means between said display area and said recording medium for providing a uniform light acceptance association between elemental areas of said display area and elemental areas of said recording medium, and second driving means operatively associated with at least one of said light-recording medium and said light transmission means and with said first driving means for repetitively changing said light acceptance association in accordance with changes in said radiation acceptance direction to produce on said light-recording medium and in-focus image of the distribution of radionuclides across a preselected plane through said object.

3. Apparatus as claimed in claim 2, wherein said radiation-shielding means comprises a radiation collimator of substantially radiation-impervious material defining an array of mutually spaced apertures, each of said apertures having a common nonnormal axial orientation with respect to said transducer; said collimator being rotatably mounted adjacent said transducer; and said first driving means comprises means operative to rotate said collimator, said predetermined patterned movement of each image thereby being substantially circular, the center of each said circular movement corresponding to the plane position coordinates of its associated elemental volume of radionuclides and the radius of said circular movement being proportional to the separation distance between said elemental volume and said transducer.

4. Apparatus as claimed in claim 3, wherein said light-recording medium is mountable at a preselected fixed spacing from said display area, and said light transmission means comprises a light collimator for directing light from each elemental area of said display area along a common nonnormal path to said associated elemental area of said recording medium, said light collimator being rotatably mounted adjacent said display area; said second driving means comprises means for rotating said light collimator synchronously with said rotation of said radiation collimator, whereby said recording medium records an in-focus image of the distribution of radionuclides across a plane through said object associated with said preselected spacing.

5. Apparatus as claimed in 3, wherein said light transmission means comprises a lens system for focusing each spot of light on said display area on an associated area of said recording medium; said recording medium is mounted in a manner such that it can precess in a circle of a preselected radius; and said second driving means comprises means for causing a precession of said recording medium synchronously with said rotation of said radiation collimator, whereby said recording medium records an in-focus image of the distribution of radionuclides across a plane through said object associated with said preselected radius.

6. Apparatus for imaging an object having a three-dimensional distribution of radionuclides therethroughout, comprising:
   a radiation detector including a radiation-sensitive transducer means having a two-dimensional radiation-detecting capability and output means associated with said transducer, including a two-dimensional screen, operative to produce on said screen a spot of light in a position corresponding to the plane position coordinates of each quantum of radiation interacting with said transducer;
   a multichannel radiation collimator rotatably mounted in a position adjacent said transducer, the axis of each channel of said collimator having substantially the same nonnormal angular orientation with respect to said transducer;
   support means for supporting said radiation detector in a stationary position with respect to said object;
   driving means for rotating said collimator so that a circular locus of light spots corresponding to each elemental volume of radionuclides is produced on said screen, the radius of said locus being proportional to the depth of said elemental volume and the center of said locus corresponding to the plane position coordinates of said elemental volume; and
   imaging means operatively associated with said screen and said radiation collimator to transform each circular loci of spots thereon of a selected radius to substantially point images on an image plane whereby an overall in-focus image of radionuclides across a plane through said object associated with said selected radius is produced.

7. Apparatus as claimed in claim 6, wherein said imaging means comprises
   a multichannel light collimator rotatably mounted in a position adjacent said screen, the axis of each channel of said collimator having substantially the same nonnormal angular orientation with respect to said screen;
   light-recording means mounted in a variably spaced relation from said collimator opposite said screen; and
   means for rotating said light collimator in synchronism with said rotation of said radiation collimator.

8. Apparatus as claimed in claim 6, wherein said imaging means comprises
   light-recording means mounted in a spaced relation from said screen;
   light-focusing means between said screen and said light-recording means for focusing spots of light on said screen to corresponding spots on said light-recording means; and
   means for moving said light-recording means in a circular precession of a selected radius in synchronism with said rotation of said radiation collimator.

\* \* \* \* \*